TRANSVERSE RECORD SCANNING MECHANISM

Filed Oct. 11, 1956

INVENTOR.
PAUL R. HOFFMAN
BY
William R. Nolte
AGENT

Sept. 2, 1958 P. R. HOFFMAN 2,850,238

TRANSVERSE RECORD SCANNING MECHANISM

Filed Oct. 11, 1956 7 Sheets-Sheet 2

INVENTOR.
PAUL R. HOFFMAN
BY
William R. Nolte
AGENT

TRANSVERSE RECORD SCANNING MECHANISM

Filed Oct. 11, 1956 7 Sheets-Sheet 3

INVENTOR.
PAUL R. HOFFMAN
BY
William R. Nolte
AGENT

TRANSVERSE RECORD SCANNING MECHANISM

Filed Oct. 11, 1956 7 Sheets-Sheet 4

INVENTOR.
PAUL R. HOFFMAN

BY

William R. Nolte
AGENT

TRANSVERSE RECORD SCANNING MECHANISM

Filed Oct. 11, 1956 7 Sheets-Sheet 5

INVENTOR.
PAUL R. HOFFMAN

BY

William R. Nolte
AGENT

Sept. 2, 1958 P. R. HOFFMAN 2,850,238

TRANSVERSE RECORD SCANNING MECHANISM

Filed Oct. 11, 1956 7 Sheets-Sheet 6

INVENTOR.
PAUL R. HOFFMAN
BY
William R. Nolte
AGENT

Sept. 2, 1958 P. R. HOFFMAN 2,850,238

TRANSVERSE RECORD SCANNING MECHANISM

Filed Oct. 11, 1956 7 Sheets-Sheet 7

INVENTOR.
PAUL R. HOFFMAN

BY
William R. Nolte
AGENT

United States Patent Office 2,850,238

Patented Sept. 2, 1958

2,850,238

TRANSVERSE RECORD SCANNING MECHANISM

Paul R. Hoffman, Woodlyn, Pa., assignor to Burroughs Corporation, Detroit, Mich., a corporation of Michigan Application October 11, 1956, Serial No. 615,343

14 Claims. (Cl. 235—61.11)

This invention relates to a record scanning mechanism wherein a data bearing record is read, and more particularly to a machine which reads the information contained in a coded record.

The principal object of the invention is to provide a reading device for scanning a coded record medium.

Another object of the invention is to provide a reading device for scanning a coded record medium wherein the scanning is accomplished step-by-step transversely to the direction of feed of the record.

Another object of the invention is to provide a scanning mechanism which mechanically and electrically detects the pattern of data contained within the data record.

Still another object of the invention is to provide a reading device wherein the scanning of a record tape is accomplished in a channel-by-channel fashion.

Another object of the invention is to provide a transverse record scanning device which enables the simultaneous interpretation of a series of characters coded by markings contained in a plurality of channels arranged parallel to the direction of feed of the record and wherein each transverse row of perforations is representative of one character, and further wherein the information for each character is obtained additively by scanning each row in a direction transverse to the direction of feed of the record.

A further object of the invention is to provide a parallel code scanning mechanism which obviates the need for interpretation of the information which has been sensed.

Another object of the invention is to provide a reading device which is simple and yet positive in its action which will read a record stepped through the device at high speed.

With these and other objects in view, the present embodiment of the invention contemplates a single row of sensing pins oriented in parallel relation to parallel disposed perforation channels in a record. The row of sensing pins as a group is stepped transversely to the record and adjacent to one surface of the record and caused to dwell in alignment with each perforation channel. The sensing pins are then moved during the dwell period to cause the ends of sensing pins opposite perforations in a given channel to be passed through to the other surface of the record, the remaining pins not opposite perforations in the record being restrained by the record to remain adjacent said one surface thereof. A plurality of interposers adjacent said other surface of the record are then moved into engagement with the projecting ends of those pins passed through the perforations and are caused to close electrical contacts to permit an electrical signal to be passed through a circuit which has been completed.

Other objects of the invention will be pointed out in the following description and claims and illustrated in the accompanying drawings, which disclose, by way of examples, the principle of the invention and the preferred manner of applying that principle.

Figures 1, 5:
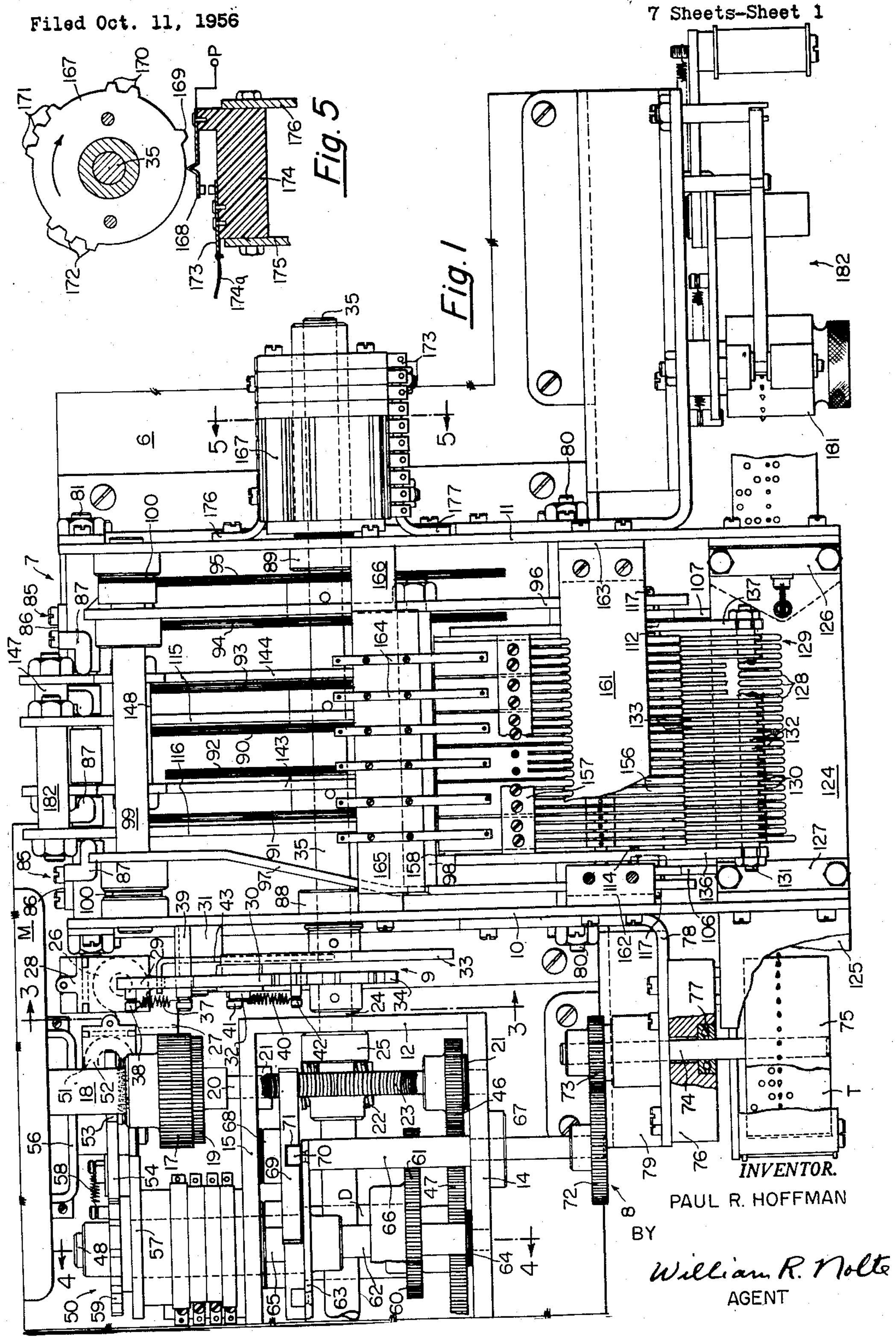
Fig. 1 is a plan view of the machine.
Fig. 5 is a section in elevation showing the electrical signal pulser unit taken on the line 5—5 of Fig. 1.
Figure 2:
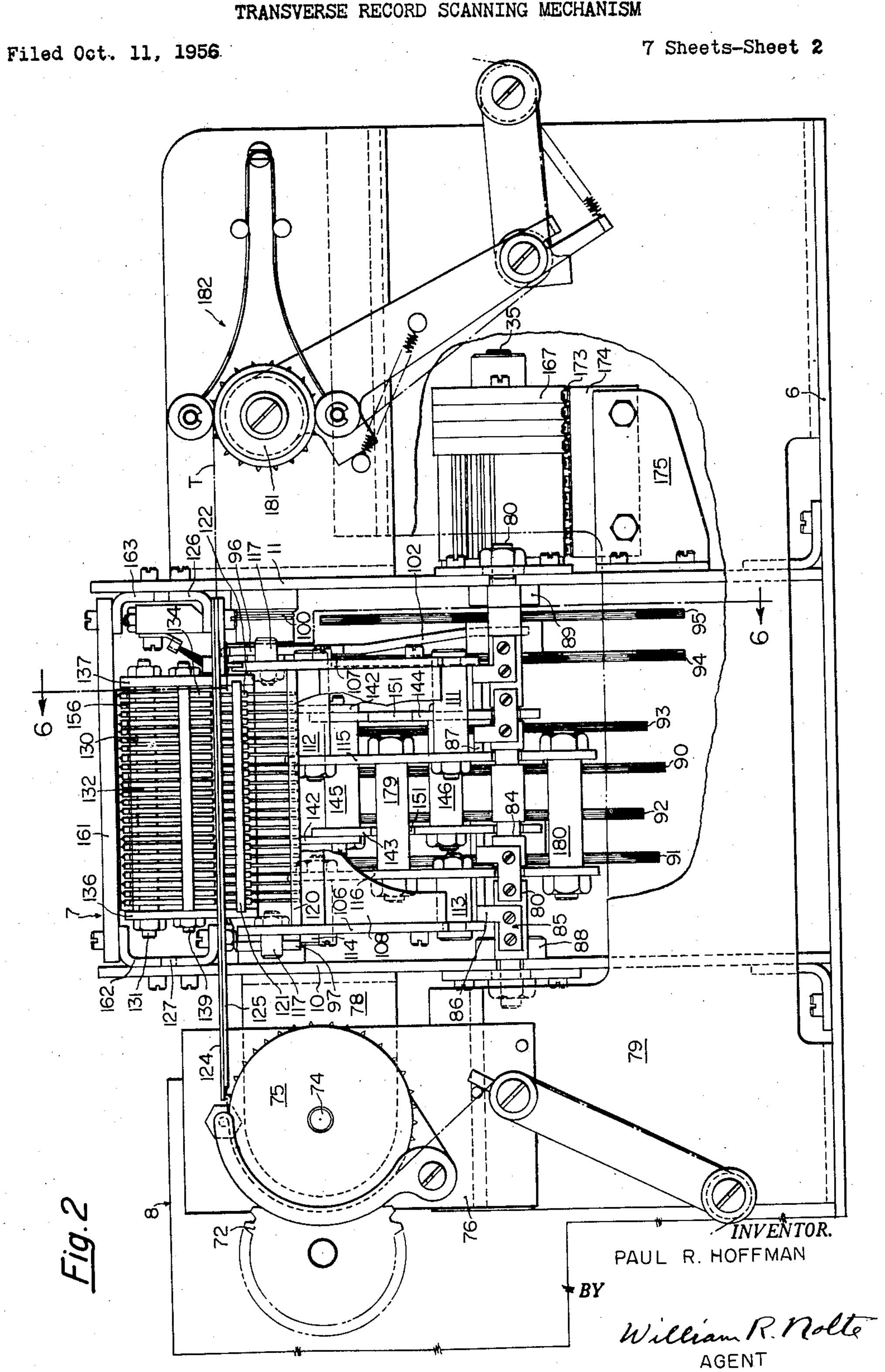
Fig. 2 is a front elevation of the machine.

Referring to the drawings in detail and in particular to Figs. 1 and 2, a main base plate 6 of any suitable type, supports the entire framework and driving mechanism of the machine. The pin sensing unit 7 is supported by two upright plates 10 and 11. The record feeding mechanism unit 8 is additionally supported by two pairs of upright plates 12, 13, 14 and 15. The power supply for driving the two units is derived from a motor M suitably secured to the base plate 6. When the tape read motor M is rotating, gear 17 fastened to the shaft 18 of said motor meshes with gear 19 thereby causing shaft 20 to rotate. The ends of shaft 20 are suitably mounted in bearings 21 affixed to the end plates. Worm 22 fastened to shaft 20 intermediate its length, then drives, through worm wheel 23, shaft 24 which is likewise supported for rotation in a bearing 25 in side plate 12 of the aforementioned tape feed unit 8. A clutch 9 intermediate said feed unit 8 and the tape read unit 7 includes a clutch magnet 26, see also Fig. 3, affixed to base plate 6 by means of bracket 27. Upon being energized magnet 26 causes clapper 28 of said magnet to strike stop lever 29 and rotate it clear of the tape read clutch dog 30. Stop lever 29, it will be observed is pivotally mounted as at 31 to plate 10 of sensing unit. The tape read clutch dog 30, pivotally fastened as at 32 to anti-backup cam 33 engages toothed wheel 34 fixed to shaft 24. The anti-backup cam is fastened to the tape read drive shaft 35. Clapper 28 upon de-energization of magnet 26 is urged away from said magnet by spring 36 connected at one of its ends to an extremity of said clapper and at its other end to magnet mounting bracket 27. Stop lever 29 is likewise normally moved by means of spring 37, affixed at one of its ends to pin 38 and at its other end to post 39 mounted in plate 10. The above mentioned clutch dog 30 upon being released from engagement by said stop lever 29 is urged into engagement with toothed wheel 34 likewise by a spring 40 secured at one of its ends to pin 41 affixed to said clutch dog and at its other end to pin 42 integral with anti-backup cam 33. An anti-backup pawl 43 is provided to insure unidirectional rotation of drive shaft 35. It is likewise pivotally mounted as at 31 and is urged into contact with the outer periphery of cam 33 by spring 44 connected at one end to pawl 43 and at its other end to bracket 27. Reverse rotation of said cam is prevented by virtue of engagement of pawl 43 with shoulder 45 of cam 30. It is thus seen that upon energization of magnet 26, mechanical driving power is transmitted from motor M, through shafts 18, 20 and 24 through said clutch 9 to rotate the pin sensing unit drive shaft 35 of said pin sensing driving unit 7, the description of which will follow later.

Figure 3:
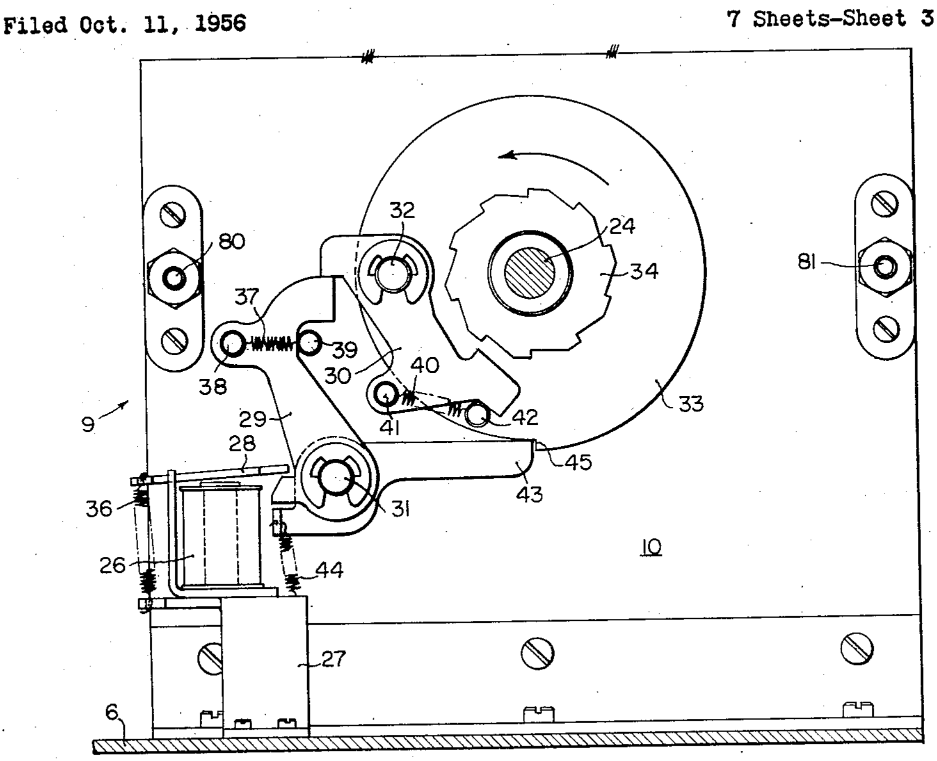
Fig. 3 is a section in elevation taken on the line 3—3 of Fig. 1.
Figure 4:
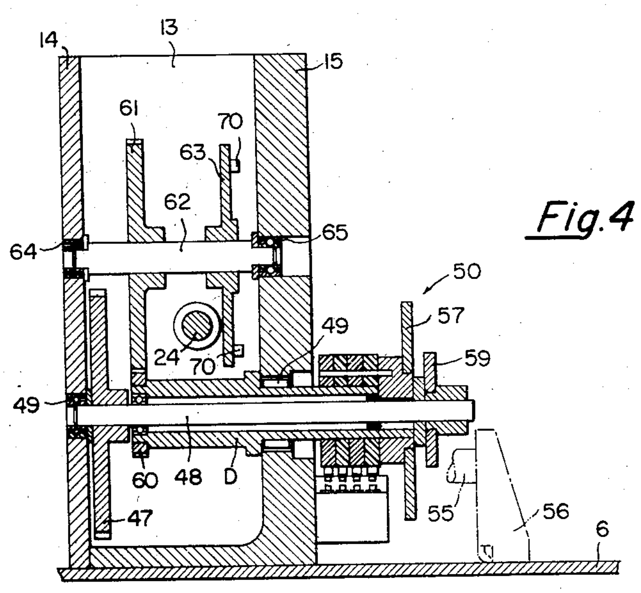
Fig. 4 is a section in elevation taken on the line 4—4 of Fig. 1.

Mechanical power to advance the tape T is transmitted to gear 46 also fastened to shaft 20, which through gear 47 drives shaft 48, see Fig. 4. Shaft 48 is mounted for rotation in bearings 49 mounted in plates 14, 15 and power from said shaft is transmitted through the tape feed clutch 50 secured at the opposite end of said shaft. The latter clutch similar in operation to the previously described pin sensing mechanism clutch 9 includes a magnet 51 which when energized pivotally moves its clapper 52 which thereupon strikes stop lever 53 and rotates it clear of the clutch dog 54. Magnet 51 is suitably affixed to base plate 6, and stop lever 53 is mounted for pivotal movement as at 55 on supplementary bracket 56 affixed to base plate 6. It should be understood that the stop lever 53 rotates on pivot 55 of bracket 56 in the same manner as the rotation of stop lever 29 of clutch 9 on pivot 31 of plate 10, as seen in Fig. 3. The tape feed dog clutch 54 pivotally mounted on anti-backup cam 57, by means of spring 58 is urged into engagement with toothed wheel 59 fastened to the aforementioned rotating shaft 48. The anti-backup cam 57 is mounted on hollow shaft D. As the hollow shaft D rotates, gear 60 fastened to it, drives the Geneva drive shaft 62, through gear 61 which is secured to shaft 62. Also fastened to the Geneva drive shaft 62 is the Geneva drive wheel 63. Shaft 62 is mounted at its ends for rotation in bearings 64, and 65 mounted in end plates 14 and 15 respectively. An additional shaft 66 likewise mounted in bearings 67 and 68 in end plates 14 and 15 respectively has a Geneva driven wheel 69 fixed thereon. A single tooth 70 of the driving wheel 63 engages in the notches 71 of the driven wheel 69 and turns the latter a distance of one notch or indexed position in every revolution of the drive wheel 63, thereby providing intermittent advancement of the record which is to be sensed through a gear train, a description of which follows. While the present embodiment of the invention utilizes a Geneva movement, it should be understood that other well known mechanical movements may be used in lieu thereof intermittently to advance a record so as to cause the record to be at rest when it is being sensed.

Fixedly mounted on shaft 66 is gear 72 which through gear 73, mounted on one end of shaft 74, drives shaft 74 which carries the tape sprocket 75. Shaft 74 it is observed is suitably journalled in bearing block 76 as by bearing 77 which block in turn is supported by brackets 78 and 79 affixed to side plate 10 and base plate 6 respectively.

Figure 6:
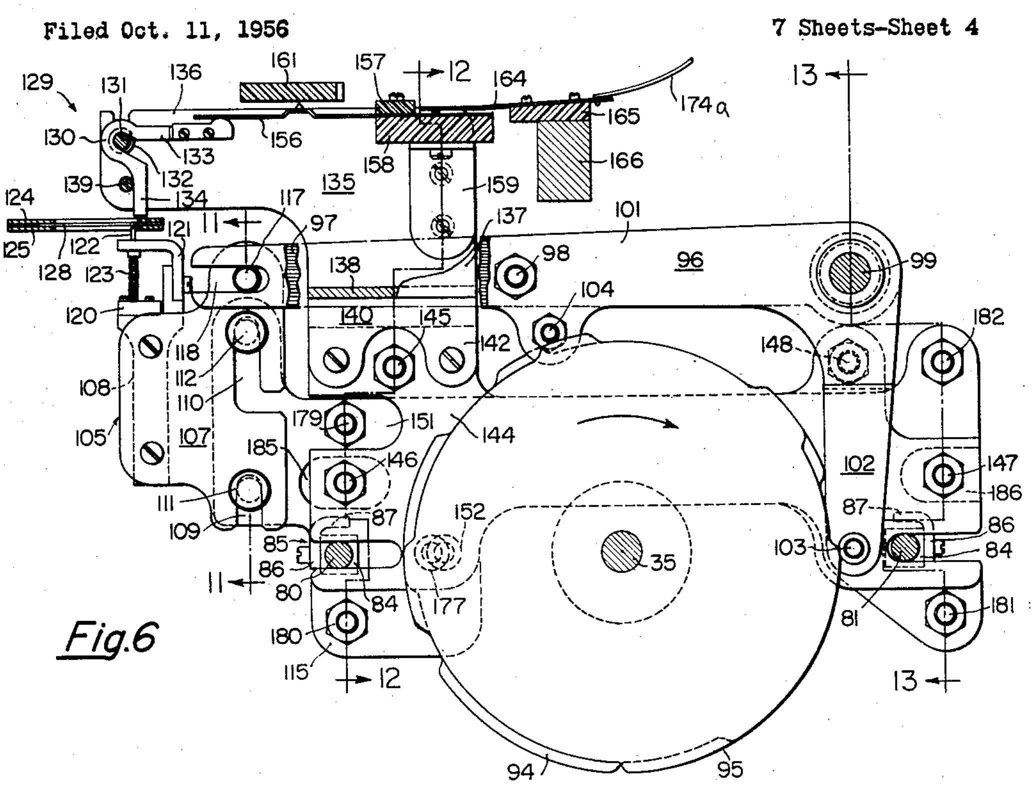
Fig. 6 is a partial sectional view of the pin sensing mechanism in side elevation taken on the line 6—6 of Fig. 2.

Referring to Figs. 1, 2 and 6 the record sensing mechanism indicated generally by the numeral 7 comprises a forward slide guide shaft 80 and a rear slide guide shaft 81, each mounted transversely in said upright plates 10 and 11. The shafts 80 and 81 serve a twofold purpose, i. e., to support said upright plates 10 in vertical alignment, and to guide the pin shift slide assembly 82 shown in detail in Fig. 9 and the contact sense slide assembly 83, Fig. 8, for aligned parallel movement. Each of said guide shafts 80 and 81 is generally of rectangular stock but has a plurality of notches 84 spaced along its length. The notched portions of said shaft are circular in cross-section being of smaller diameter than the dimensions of said rectangular portions in cross section. A plurality of slide guides 85 are secured on the front and rear flat surfaces respectively of said shafts 80 and 81 and adjacent to said notches 84. Each of said slide guides 85 is generally in the form of a clip and is comprised of a vertically depending portion 86 secured to said aforementioned flat surfaces of said shafts and a horizontal flange 87 disposed forwardly and rearwardly along a margin of notch 84, see Figs. 1, 2 and 6.

Figure 7:
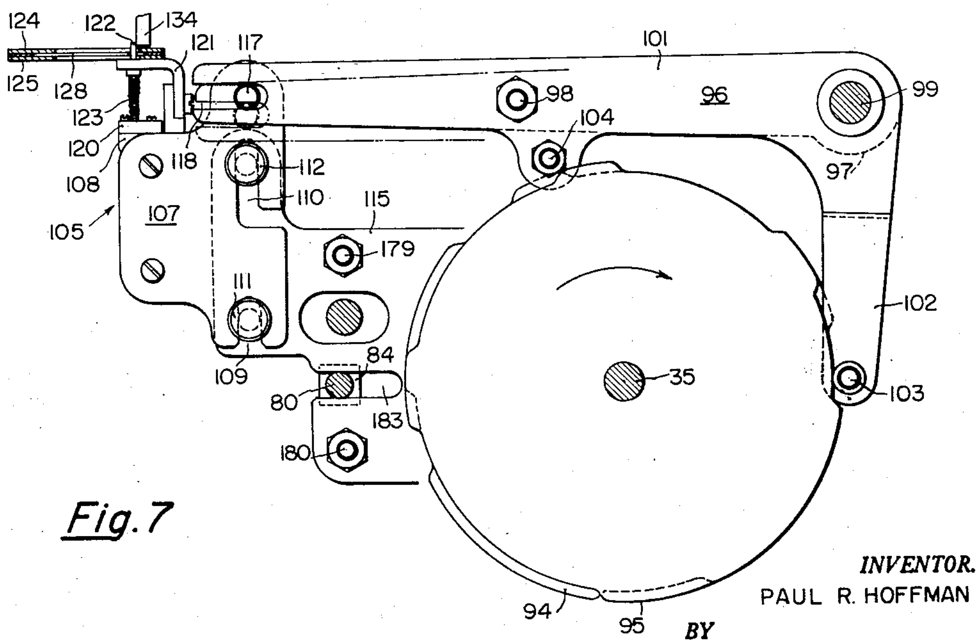
Fig. 7 is a longitudinal side elevational view of the pin sensing mechanism similar to Fig. 6 but showing in particular the drive means for raising and lowering the sensing pin assembly.
Figure 13:
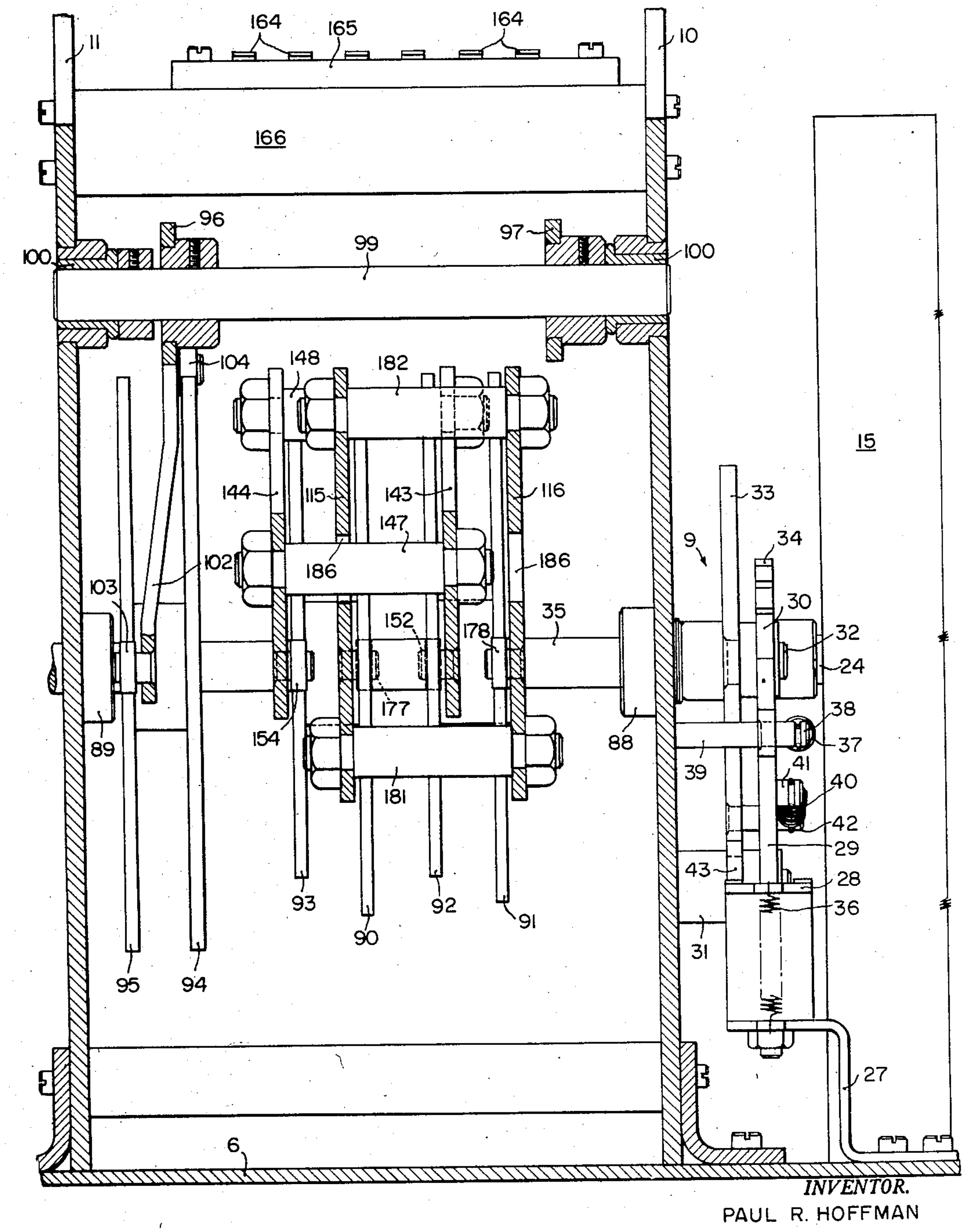
Fig. 13 is a transverse section taken on the line 13—13 of Fig. 6 showing the interrelation of the pin shift slide assembly and the contact sense slide assembly at their rear portions.

The pin sensing unit 7 as previously mentioned is driven by transverse cam shaft 35 which is journalled at the same elevation and aligned midway between said slide guide shafts 80 and 81. Bearings 88 and 89 mount the drive shaft 35 for rotation in side plates 10 and 11. Pin shift cams, male 90, and female 91, Fig. 9, contact sense cams, male 92 and female 93, Fig. 8, and pin sense cams, male 94 and female 95, Fig. 7, are all fixed on drive shaft 35 in spaced relation therewith. See also Fig. 1 and Fig. 13.

The pins sense cams 94 and 95, Figs. 6 and 7, rotate the pin sense bellcrank 96 and arm 97 suitably maintained in spaced parallel relation by spacer stud shaft 98, about the axis of transverse shaft 99, said arms also being fixed to said shaft 99. Shaft 99 is mounted for rotation between side plates 10 and 11 by bearings 100, Fig. 13. As seen in elevation in Figs. 5, 6 and 9, bellcrank 96 has an horizontal arm 101, and a vertical leg 102 offset for non-planar relationship with said horizontal arm. The vertical leg 102 carries at its extremity a cam follower 103 which engages the periphery of pin sense cam female 95, while horizontal arm 101 along its length carries follower 104 which engages the periphery of male cam 94. It is thus seen that bell crank 96 is directly coupled to cams 94 and 95 to positively drive said bell crank throughout the entire revolution of said cams.

Sensing pin support assembly 105 mounted upon the forward extremities of bell crank 96 and arm 97 for sliding movement is thereby driven vertically by the aforementioned drive action. Sensing pin support assembly 105 comprises a pair of upright plates 106 and 107, see Fig. 11 maintained in spaced parallel relation by means of transverse pin block body 108 secured to said plates adjacent their forward edges. Each plate is vertically slotted adjacent its rear edge as at 109 and 110, said slots receiving pin sense guide studs 111, 112 and 113, 114 fixedly mounted in slide plates 115, 116 of the previously mentioned pin shift slide assembly 82. A pin drive stud 117 is fastened on the top of each side plate 106, 107 on the vertical axis of slots 109, 110 and said stud is received in horizontal slots 118, 119 of parallel disposed bell crank 96 and arm 97. Pin block insert 120 and flanged retainer 121 above said insert are likewise disposed transversely of side plates and suitably fastened to block 108. A plurality of sensing pins 122, spring loaded by means of encircling springs 123 are slidably mounted in aligned holes top and bottom in said insert 120 and retainer 121. In the present embodiment of the invention twenty-four sensing pins are shown which permit the simultaneous sensing of twenty-four digits coded on the tape T. The transverse sensing unit 7 employs a four bit additive code, see Fig. 14, for the numeric information. The "1" bit corresponding to channel one of said tape, has a "value" of one pulse; the "2" bit corresponding to channel 2 has a value of two pulses, the "3" bit has a value of three pulses; the fourth channel of the tape is used for feed purposes and is designated "F"; the "4" bit corresponding to channel 5 also has a "value" of three pulses; the sixth channel is used for registration of the tape and control code purposes and is designated "R." Thus the output of the sensing device 7 is a parallel reading in serial pulse form.

Tape T is advanced step by step in increments corresponding to the word length of the tape which is the distance between registration holes. The tape is guided during such movement and retained in position relative to the sensing pin support assembly 105 by means of a pair of plates 124 and 125, top and bottom, fastened to side plates 10 and 11 by brackets 126 and 127 as shown in Fig. 2. The upper end of each sensing pin 122 is adapted to enter axially aligned slots 128 in said plates, see Figs. 1 and 9.

Figures 8, 10:
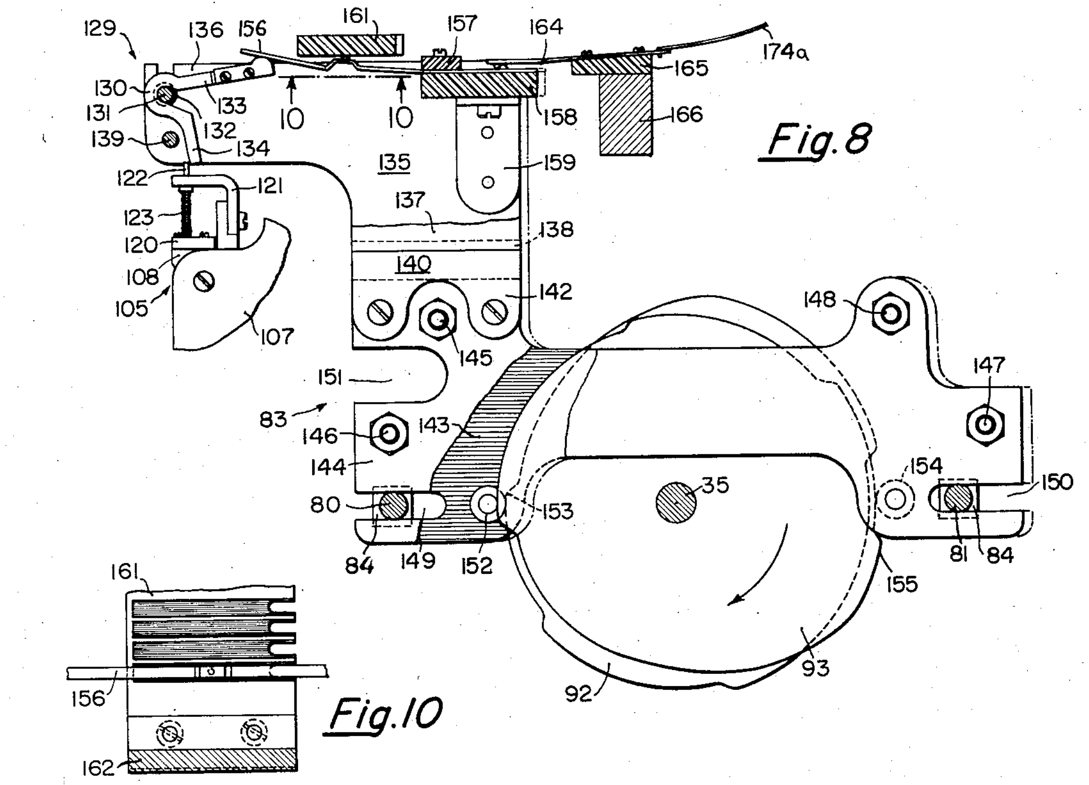
Fig. 8 is a longitudinal side elevational view similar to Fig. 6 showing the contact sensing assembly with its interponents rotated upon striking the sensing pins to cause closure of the contacts against the printed circuit board.
Fig. 10 is a view taken on line 10—10 of Fig. 8 illustrating the printed circuit board.
Figure 9:
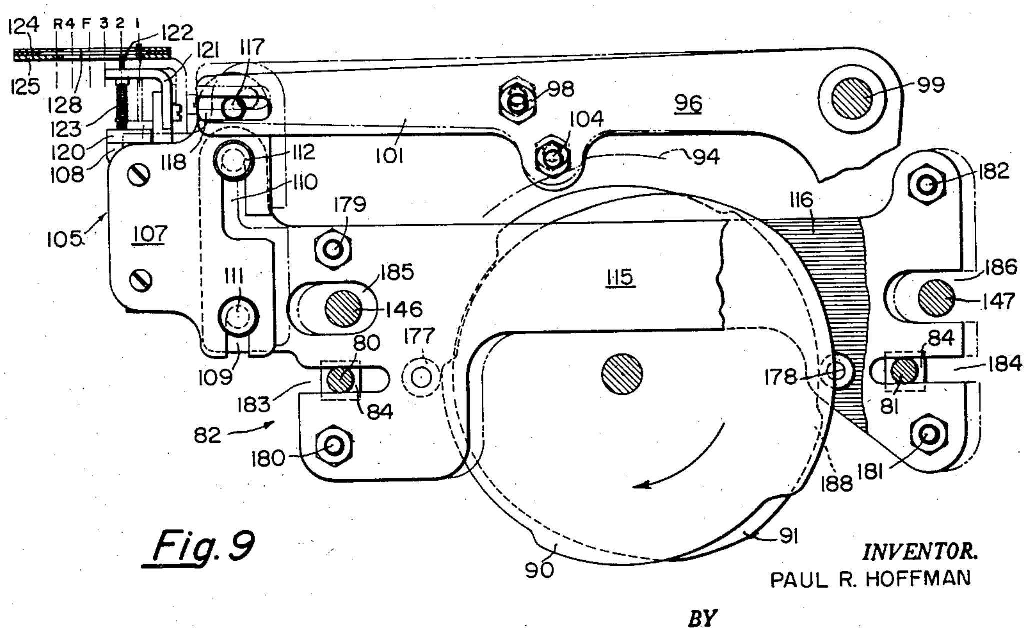
Fig. 9 is a longitudinal side elevational view similar to Fig. 6, showing the drive means for moving the pin shift slide assembly from the first channel position of the tape to its second channel position.

Contact sense assembly 129, best shown in Fig. 8, is comprised of a plurality of pivotally mounted interposers 130, one for each sensing pin 122, mounted on crossed interposer shaft 131. Spaced shoulder portions 132 of said shaft guide said interposers above and for engagement with the tops of the aforementioned sensing pins. Each interposer 130 is in the form of a bell crank having a horizontal arm 133 and a vertically depending leg 134. Contact sense assembly 129 further includes a generally U-shaped bracket 135, also shown in Fig. 12, having a pair of upstanding side walls 136, 137 which extend forwardly of its base portion 138. An interposer stop shaft 139 likewise mounted transverse of said sides 136 and 137 below said interposer shaft 131 limits the forward movement of the vertical legs 134 of interposers 130. A smaller U-shaped bracket support 140 having a central base portion 141 and a pair of downward extending flanges 142 is secured to base 138 of contact sense bracket 135 and said flanges 142 are suitably connected to the top forward portions of the generally rectangular contact sense slide plates 143 and 144. Four spacer studs 145, 146, 147 and 148 are disposed forwardly and to the rear of said slide plates (Fig. 8). Elongated horizontal slots 149 and 150 adjacent the lower edges of said slide plates are engaged in the notches 84 of the aforementioned slide guide shafts 80 and 81 for aligned motion of said contact sense assembly. Slots 151 above and adjacent slots 149 provide sliding clearance for the pin shift assembly 82 (Fig. 9). Referring in particular to Fig. 8 it will be seen that slide guide plate 144 has been shown broken to illustrate its companion plate 143. Plate 143 has fastened thereto a forward cam follower roller 152 which coacts with the male contact sense cam 92. The forward roller 152 as shown has just rolled over the first rise or lobe 153 of male cam 92 and has by such motion caused the entire contact sense assembly 83 to move from the broken line position to the full line position. The rear cam follower roller 154 affixed to slide plate 144 conversely has just rolled off the high portion or lobe 155 of the female cam 93. It can be further observed that the peripheries of the male and female cams 92 and 93 are complemental such that the contact sense assembly is positively driven throughout the entire rotation of said cams about the axis shaft 35.

Figures 11, 12, 14:
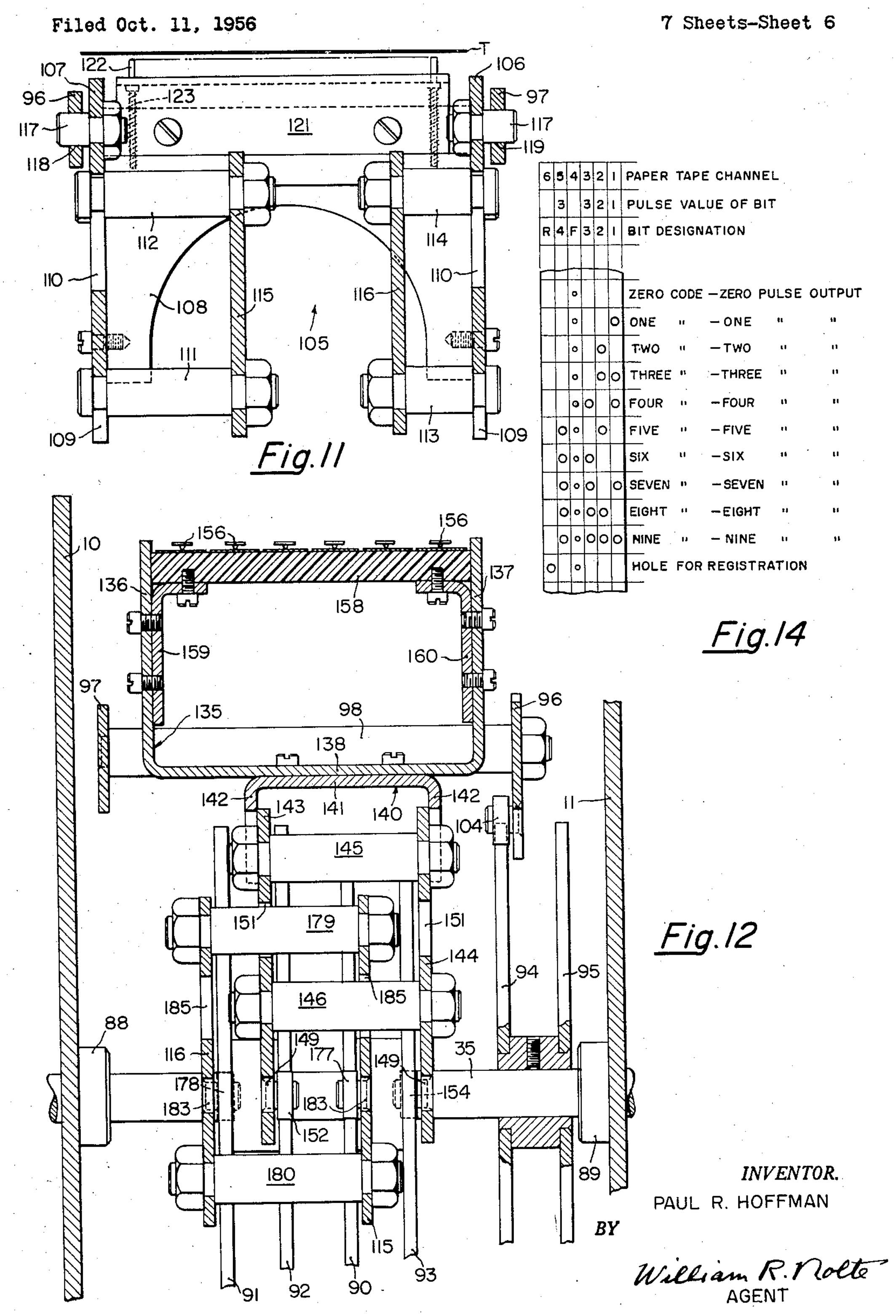
Fig. 11 is a transverse section taken on line 11—11 of Fig. 6 illustrating portions of the pin sensing assembly.
Fig. 12 is a forward transverse section taken on the line 12—12 of Fig. 6 showing the interrelation of the pin shift slide assembly and the contact sense slide assembly.
Fig. 14 is a plan view of a sample portion of the tape which is to be read by the machine.

Referring in detail to Figs. 6, 8 a plurality of electrical spring contacts 156 are shown corresponding in number to said sensing pins 122 and said interposers 130, and at one of their ends are suitably fixed in transverse top and bottom mounting blocks 157 and 158 respectively. Brackets 159 and 160 secure the ends of the aforementioned mounting blocks to the upstanding side walls 136 and 137 of bracket 135 (Fig. 12). Referring to Figs. 1 and 2, a printed circuit contact block 161 is shown mounted transversely of upright side plates 10, 11, by means of brackets 162 and 163. The block is so positioned as to make good electrical contact with intermediate portions of contacts 156 (Figs. 6 and 8) which are moved upwardly due to the aforementioned rotation of interposers 130 during the successive reading positions of the contact sense assembly 83. Correspondingly a plurality of spring wiper contacts 164 of suitable length are mounted to transverse wiper bar 165 which in turn is affixed to support bar 166 secured to side plates 10 and 11. It is apparent that the lengths of the aformentioned wiper contacts 164, and the depth fore and aft of the contact printed circuit block 161 are sufficient to accommodate the movement of the contacts 156 during transverse movement of the contact sense assembly 83 (Fig. 8) relative to the tape T.

When the contacts 156 are moved against the printed circuit block 161, the pulser cam 167, made of insulating material (Figs. 1 and 5) fastened to the main drive shaft 35 rotates and closes the pulser contacts 168 at the correct instance and for the correct period of time. As seen in Fig. 5, the pulser cam 167 is indexed about its periphery with groups of lobes 169, 170, 171 and 172 corresponding to channel designations 1, 2, 3 and 5 of the tape T. Numeral 169 designates one lobe which when rotated deflects pulser contact 168 into engagement with contact 173, the latter contacts 168 and 173 are both secured to switch block 174 which in turn is mounted to side plate 10 by means of brackets 175 and 176. Numeral 170 designates a pair of lobes which correspond to channel 2 of said tape wherein two pulses are emitted when the second channel of said tape is being sensed, and likewise numerals 171 and 172 designate groups of lobes of three in number wherein three pulses are emitted when the third and fourth channels of said tape are sensed. Contact 168 is connected to a suitable source of electric current P as shown, and contacts 173, are connected by leads **174*a* to the before mentioned spring wiper contacts 164. Upon closure of contacts 168 with contacts 173 the current from said source P will flow through contacts 168, 173 through leads 174 then to spring wiper contacts 164, to those sense contacts 156 which have been moved into engagement with the printed circuit board 161. From circuit board 161** the current flow in the form of pulses may be fed to a suitable storage device not shown for control of an accounting machine of the type described in copending application of Bradshaw et al., Serial Number 492,186, filed March 4, 1955.

After the number "1" bit of the tape T has been read, the pin sense bell crank 96 and arm 97 are moved downward with further rotation of pin sense cams 94 and 95, see Figs. 6 and 7. The sensing pin support assembly 105 is moved downwardly thereby causing sensing pins 122 to move out of the holes in the number "1" bit of the tape T to be returned to their initial positions by action of encircling springs 123. This then permits the interponents 130 to be moved back to their rest positions by the spring action of the contacts 156 as they leave the printed circuit block 161.

The sensing pin support assembly 105 is then shifted to the left by leftward movement of the pin shift slide assembly 82 as seen in Fig. 9 from the number "1" bit of the tape to the number "2" bit or channel. This shifting operation is accomplished in the following manner: pin shift cams 90 and 91, fastened to slide plates 115 and 116 of pin shift assembly 82, move said assembly to the left as seen in Fig. 9. The slide plates 115 and 116 are likewise maintained in parallel spaced relationship by spacer studs 179, 180, 181 and 182 (Fig. 12). Slide guide plate 115 has been shown broken to illustrate its companion plate 116. Cam 91, female, is shown coacting with the cam follower roller 178 secured to plate 116 while cam 90, male, is shown in contact with roller 177 mounted to plate 115. Elongated notches 183, 184 disposed along the lower edges of said plates, engage slide guide shafts 80 and 81 in notches 84 for parallel forward and rearward movement of said plates relative to said shafts. A second pair of notches 185 and 186 respectively are located above notches 183 and 184 and provide clearance for the previously mentioned spacer studs 146 and 147 of the contact sense slide assembly 80 thereby permitting relative movement of the latter named assembly with the pin shift assembly 82. From further inspection of Fig. 9 it is seen that roller 177 has just rolled over the first rise or lobe 187 of male cam 90 and has by such motion caused the entire assembly 82 to move from the dotted line position corresponding to the channel "1" tape reading position of the device to the full line position shown, which corresponds to the channel "2" tape reading position of the device. The rear cam follower roller 178 female complementally has just rolled off the high position 188 and into a low periphery of the cam, the action thereof being positive throughout the entire revolution of the cams 90 and 91.

Referring to Figs. 1 and 2, the paper tape T is adapted to be brought over the tape drag sprocket 181, which is part of a tape tension control assembly 182 of conventional construction. The tape is then passed through the aforementioned set of guide plates 124 and 125 which correspond to the reading position of the mechanism, and is further passed over the tape drive sprocket 75 which through the aforementioned record feed mechanism 9 supplies the impetus for advancing the tape. By the correct choice of gears 72 and 73 word lengths of desired length may be obtained, in this case twenty-four, as there are twenty-four sensing pins arranged to scan the successive columns of the tape transverse to its direction of feed.

*Operation*

Assume that twenty-four digits represented by a predetermined pattern of holes in the "1," "2," "4" and "5" channels of the tape is to be sensed, see Figs. 6 and 14, bearing in mind that fourth channel designated "F" is used for feed purposes and the sixth channel designated "R" is used for registration of the tape. At the start of the cycle the sensing pins 122 of the pin sensing assembly 105 are aligned with the first channel of the tape T. The drive shaft 35 causes rotation of the pin sense cams 94 and 95 which impart motion to the pin sense bell crank 96 and arm 97 thereby causing the transverse sensing pin assembly 105 carrying sensing pins 122 to move vertically to sense the first channel of the tape T. If there are holes in the tape the pins 122 go through as shown in Fig. 7. At this point in time the contact sense slide assembly 83 is driven forward by the set of contact sense cams 92 and 93 to a sensing position as shown in Fig. 8. During this forward movement the ends of those sensing pins which have been passed through the tape are struck by the vertically depending legs 134 of corresponding interposers 130, thereby rotating the same. Horizontal arms 133 of said interposers engage contacts 156 and move the same in contact with printed circuit board 161. While the contacts 156 are thus closed the pulser 167 sends one pulse through the circuit which has been completed.

It is evident that if there are no holes in the tape T, the tape T causes the sensing pins 122 to move down relative to the pin sense assembly 105 against the action of springs 123; therefore when the contact sense slide assembly 120 moves forward there will be no action of the interposer 130. Thus the contacts 156 in these positions will not close and the pulse from pulser 167 will not pass through the circuitry. As the cycle continues the pin sense bell crank 96 and arm 97 move the transverse sensing pin support assembly 105 down and out, from its sensing position to its non-sensing position as shown in Fig. 9. This causes the interponents 130 to be moved back to their rest positions by the spring action of the contacts 156 as they leave the printed circuit 161. At this point the pin shift cams 90 and 91, through followers 177 and 178, move the pin shift slide assembly 82 forward (i. e. to the left as seen in Fig. 9) thereby moving the pin support assembly 105 sufficient to the left to place the sensing pins 122 in the "2" bit channel of the tape. The pin sensing and contact sensing operations are repeated as above and while the contacts 130 are closed (if a hole is present) or open (if there is no hole) the pulser 167 sends two pulses into the circuitry.

The sensing of bits corresponding to the number three and five channels is identical to that of bits "1" and "2" except that for both bit "3" and bit "4" the number of pulses is three. After reading the fifth channel the pin shift assembly 82 and the contact sense assembly 83, which carries the pin sense assembly 105, are returned by their respective cams to their most rightward or original starting position which is the channel one position thereby concluding the cycle.

It should be noted that all of the action in the above description constitutes one cycle of operation and is accomplished during only one revolution of drive shaft 35. While rotation may be at any desired rate, it has been found in actual practice that an ideal rate of rotation of the shaft is approximately two and one half revolutions per second. Inasmuch as there are twenty-four pins in the sensing head, scanning is with great rapidity and therefore it can be realized that the actual sensing capacity of the machine is substantially above apparatus heretofore in use.

It should further be understood that while the above selected embodiment of the invention relates to sensing a coded record containing perforations therein, the scope of the invention may encompass the sensing of other coded records such as, for example, those coded with magnetic spots. This may easily be accomplished by substituting magnetic sensing means in lieu of the sensing pins and providing relative movement between said sensing means and the record coded with said magnetic spots for the purpose of scanning in a direction transverse to the direction of feed of the record medium.

While I have described what I consider to be a highly desirable embodiment of my invention, it is obvious that changes in form could be made without departing from the spirit of my invention and I therefore do not limit myself to the exact form herein shown and described, nor to anything less than the whole of my invention as above described and as hereinafter claimed.

What is claimed is:

1. In a record sensing mechanism, means for advancing a record, said record being coded by perforations in a plurality of channels arranged in side-by-side relationship and parallel to the direction of feed of the record, a single row of sensing pins oriented in parallel relation to said parallel disposed perforation channels in said record, means for successively moving said row of sensing pins as a group transversely to said record medium and adjacent to one surface thereof and for causing the row of pins to dwell in alignment with each perforation channel in the record as the row moves across the record, means for bodily moving said sensing pins as a group toward the record during each dwell period to cause the ends of ones of said pins corresponding to perforations in said channels to be passed therethrough to the other surface of said record, the remaining pins not in alignment with perforations in the record being restrained thereby to remain adjacent said one surface, and means adjacent the other surface of said record responsive to engagement with the ends of those sensing pins passing through said perforations to close electrical contacts.

2. In a record sensing mechanism, means for advancing a perforated record, said record being coded by perforations in a plurality of channels arranged in side-by-side relationship and parallel to the direction of feed of the record, drive means for said mechanism, a row of sensing pins, each mounted for reciprocal movement on one side of said record to pass through a perforation therein, electrical circuit means disposed on the other side of said record, electrical signal pulser means driven by said drive means, slide means mounted for movement between said sensing pins and said electrical circuit means, a plurality of interponents each mounted for pivotal movement in said slide means and in the plane of a corresponding sensing pin, a plurality of electrical contacts mounted between said interponents and said electrical circuit means, said contacts being electrically connected to said pulser means, means for moving said slide means so that interponents are rotated upon striking said sensing pins thereby to move said contacts into engagement with said electrical circuit means to permit an electrical signal to be passed to said electrical circuit means by said pulser means, and means for stepping said row of said sensing pins to a successive perforated channel of aid record whereby said resilient contacts operate to restore said interponents to their non-rotated positions.

3. In a record sensing mechanism, means for advancing a record, said record being coded by perforations in a plurality of channels arranged in side-by-side relationship and parallel to the direction of feed of the record, a single row of sensing pins oriented in parallel relation to said parallel disposed perforation channels in said record, means for stepping said row of sensing pins as a group transversely to said record and adjacent to one side thereof and for causing said pins to dwell in alignment with each perforation channel in the record during said stepping action, means operable for bodily moving said sensing pins as a group during each dwell period to cause the ends of ones of said sensing pins opposite perforations in said channels to be passed therethrough to the other side of said record, the remaining pins not opposite perforations in the record being restrained thereby to remain on said one side thereof, and means on the other side of said record responsive to engagement with the ends of those sensing pins passing through said perforations to close electrical contacts.

4. In a record sensing mechanism, means for advancing a record, said record being coded by perforations in a plurality of channels arranged in side-by-side relationship and parallel to the direction of feed of the record, a single row of sensing pins oriented in parallel relation to said parallel disposed perforation channels in said record, means for stepping said row of sensing pins as a group transversely to said record and adjacent to one side thereof and for causing said pins to dwell in alignment with each perforation channel in the record during said stepping action, means operable during each dwell period to cause the ends of ones of said sensing pins opposite perforations in said channels to be passed therethrough to the other side of said record, the remaining pins not opposite perforations in the record being restrained thereby to remain on said one side thereof, and means on the other side of said record responsive to engagement with the ends of those sensing pins passing through said perforations to close electrical contacts.

5. In a record sensing mechanism, means for advancing a record, said record being coded by perforations in a plurality of channels arranged in side-by-side relationship and parallel to the direction of feed of the record, a single row of sensing pins oriented in parallel relation to said parallel disposed perforation channels in said record, means for causing relative transverse stepping movement between said row of sensing pins and said record and on one side thereof so that said pins are caused to dwell in alignment with each perforation channel in the record, means during each dwell period operable for causing the ends of ones of said row of sensing pins opposite perforations in said channels to be passed therethrough to the other side of said record, the remaining pins not opposite perforations being restrained thereby to remain on said one side thereof, and means on the other side of said record responsive to engagement with ends of those sensing pins passing through said perforations to close electrical contacts.

6. In a record sensing mechanism, means for advancing a record, said record being coded by perforations in a plurality of channels arranged in side-by-side relationship and parallel to the direction of feed of the record, a single row of sensing pins oriented in parallel relation to said parallel disposed perforation channels in said record, means operable for causing relative transverse stepping movement between said row of sensing pins and said record so that said pins are caused to dwell on one side of said record in alignment with each perforation channel in the record, means for causing the ends of ones of said row of sensing pins opposite perforations in said channels during each dwell period to be passed therethrough to the other side of said record, the remaining pins not opposite perforations being restrained thereby to remain on said one side thereof, and means on the other side of said record responsive to engagement with ends of those sensing pins passing through said perforations to close electrical contacts.

7. In a reader for tape having permutations of perforations in a plurality of channels arranged in side-by-side relationship and parallel to the direction of feed of the tape, a sensing pin, means operable for causing relative transverse stepping movement between said sensing pin and said tape and for causing said sensing pin to dwell in alignment with each perforation channel in the tape and on one side thereof during such movement, means for moving said sensing pin to pass its end through a perforation in said channel to the other side of said tape if there is a hole, and means on the other side of said tape responsive to engagement with the end of said sensing pin to close an electrical contact.

8. In a reading device enabling simultaneous interpretation of a series of digits coded in successive channels on a record medium the combination comprising, a source of power, sensing means, means for advancing a record medium past said sensing means, means for moving said sensing means perpendicular to the plane of said record medium, electrical circuit means including contact means, interposer means disposed between said sensing means and said contact means, means for moving said interposer means to coact with said sensing means and said contact means, and means for moving said sensing means transverse to the direction of feed of said record medium whereby a successive channel of said tape can be read.

9. In a reading device as set forth in claim 8 wherein said means for moving said sensing means perpendicular to the plane of said record medium includes, first cam means driven by said power source, and bellcrank means connected to said sensing means and coacting with said cam means, whereby rotation of said cam means rocks said bellcrank means and causes said sensing means to be moved perpendicular to the plane of said record medium.

10. In a reading device as set forth in claim 9 wherein said means for moving said interposer means transverse to the direction of feed of said record medium includes, plate means for supporting said interposer means, means for guiding said plate means for sliding movement thereof, and second cam means rotatable by said power source and coacting with said plate means to impart sliding movement thereto.

11. In a reading device as set forth tin claim 10 wherein said means for moving said sensing means transverse to the direction of feed of said record medium includes, sensing plate means for supporting said sensing means, means for guiding said sensing plate means for sliding movement thereof, and third cam means rotatable by said power source and coacting with said sensing plate means whereby rotation of said third cam means imparts sliding movement of said sensing plate means in a direction transverse to the direction of feed of said record medium.

12. In a record sensing mechanism, means for advancing a perforated record medium, said record medium being coded by perforations in a plurality of channels parallel to its direction of feed, drive means for said mechanism, a plurality of sensing pins each mounted for reciprocal movement so as to pass through perforations in said record medium, electrical circuit means disposed in spaced relation with respect to said sensing pins, electrical signal pulser means driven by said drive means, slide means mounted for movement between said sensing pins and said electrical circuit means and in a direction transverse to the direction of feed of said record medium, a plurality of interposers each mounted for pivotal movement in said slide means and in the plane of a corresponding sensing pin, a plurality of resilient electrical contacts mounted in said slide means between said interposers and said electrical circuit means, said contacts being electrically connected to said pulser means, and means for moving said slide means so that said interposers are rotated upon striking said sensing pins thereby to move said contacts into engagement with said electrical circuit means to permit an electrical signal to be passed to said electrical circuit means by said pulser means.

13. In a record sensing mechanism, means for advancing a record medium, said record medium being coded by perforations in a plurality of channels parallel to its direction of feed, a single row of sensing pins oriented in parallel arrangement with the parallel disposed channels of perforations in said record medium, printed circuit means positioned adjacent said sensing pins, electrical contact means disposed between said sensing pins and said printed circuit means, means for successively moving said row of sensing pins as a group transversely to said record medium to positions in alignment within said record medium, and means for moving said row of sensing pins, so as to pass said sensing pins through said perforations in said record medium whereby said contact means are caused to be moved in abutting relation with said printed circuit means.

14. In a record sensing mechanism, means for advancing a perforated record, said record medium being coded by perforations in a plurality of channels parallel to its direction of feed, a single row of sensing pins oriented in parallel arrangement with the parallel disposed channels of perforations of said record medium, printed circuit means positioned adjacent said sensing pins, electrical contact means disposed between said sensing pins and said printed circuit means, means for successively moving said row of sensing pins transversely to said record medium to positions in alignment with the channels of perforations in said record medium, means for moving said row of sensing pins to pass said sensing pins through perforations in said tape, and means responsive to the ends of said pins passing through said record medium for closing said electrical contact means in abutting relationship with said printed circuit means.

References Cited in the file of this patent

UNITED STATES PATENTS 2,615,626 Luhn ---------------- Oct. 28, 1952